US012639959B2

(12) United States Patent
Salti et al.

(10) Patent No.: US 12,639,959 B2
(45) Date of Patent: May 26, 2026

(54) SYSTEMS AND METHODS FOR DETECTING LANE CROSSINGS AND CLASSIFYING LANE CHANGES

(71) Applicant: Verizon Patent and Licensing Inc., Basking Ridge, NJ (US)

(72) Inventors: Samuele Salti, Prato (IT); Douglas Coimbra De Andrade, Florence (IT); Francesco Sambo, Florence (IT); Leonardo Taccari, Florence (IT); Alessandro Dicosola, Triggiano (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 282 days.

(21) Appl. No.: 18/492,321

(22) Filed: Oct. 23, 2023

(65) Prior Publication Data

US 2025/0131741 A1     Apr. 24, 2025

(51) Int. Cl.
| | |
|---|---|
| *G06V 20/56* | (2022.01) |
| *B60R 1/22* | (2022.01) |
| *G06V 10/50* | (2022.01) |
| *G06V 10/764* | (2022.01) |
| *G06V 10/82* | (2022.01) |

(52) U.S. Cl.
CPC .............. *G06V 20/588* (2022.01); *B60R 1/22* (2022.01); *G06V 10/507* (2022.01); *G06V 10/764* (2022.01); *G06V 10/82* (2022.01)

(58) Field of Classification Search
CPC .... G06V 20/588; G06V 10/82; G06V 10/507; G06V 10/764
See application file for complete search history.

(56) References Cited

U.S. PATENT DOCUMENTS

| | | | | |
|---|---|---|---|---|
| 9,340,227 | B2 * | 5/2016 | Bajpai .................. | B62D 15/025 |
| 2015/0161881 | A1 * | 6/2015 | Takemura .............. | G06V 20/56 |
| | | | | 348/148 |
| 2018/0285659 | A1 * | 10/2018 | Kwant ................... | G06V 10/48 |
| 2018/0373980 | A1 * | 12/2018 | Huval .................... | G01S 17/89 |
| 2020/0341466 | A1 * | 10/2020 | Pham ..................... | G06N 3/045 |
| 2021/0237737 | A1 * | 8/2021 | Al-Nuaimi ............. | G06N 3/045 |

(Continued)

OTHER PUBLICATIONS

Liu, Lizhe, et al. "Condlanenet: a top-to-down lane detection framework based on conditional convolution." Proceedings of the IEEE/CVF international conference on computer vision. 2021. (Year: 2021).*

(Continued)

*Primary Examiner* — Utpal D Shah

(57)     ABSTRACT

A device may receive forward facing video data associated with a vehicle, and may process the forward facing video data, with neural network models, to detect lane lines and to determine classifications for the lane lines. The device may utilize the forward facing video data to generate a histogram of horizontal positions of the vehicle, and may fit probability density functions on the histogram to calculate a mean and a standard deviation. The device may utilize the mean and the standard deviation to identify a crossing interval, and may classify the forward facing video data as a lane crossing or a lane change based on the crossing interval. The device may calculate a lane crossing score or may calculate a lane change score. The device may perform actions based on the lane crossing score or the lane change score.

20 Claims, 12 Drawing Sheets

100 —▸

(56) References Cited

U.S. PATENT DOCUMENTS

| | | | |
|---|---|---|---|
| 2022/0237889 A1* | 7/2022 | Beglerovic | G06T 11/203 |
| 2022/0392230 A1* | 12/2022 | Takagi | G06V 20/588 |
| 2024/0140475 A1* | 5/2024 | Zeng | B60W 60/001 |

OTHER PUBLICATIONS

Lee, Jin-Wook, and Jae-Soo Cho. "Effective lane detection and tracking method using statistical modeling of color and lane edge-orientation." 2009 Fourth International Conference on Computer Sciences and Convergence Information Technology. IEEE, 2009. (Year: 2009).*

Li, Xiaohan, et al. "Effects of feature selection on lane-change maneuver recognition: an analysis of naturalistic driving data." Journal of intelligent and connected vehicles 1.3 (2019): 85-98. (Year: 2019).*

Pan, Xingang, et al. "Spatial as deep: Spatial cnn for traffic scene understanding." Proceedings of the AAAI conference on artificial intelligence. vol. 32. No. 1. 2018. (Year: 2018).*

* cited by examiner

100

115

Receive forward-facing video data associated with a vehicle

Forward-facing camera 105

Vehicle

Video system 110

100

Triangle

Non-crossable line

Crossable line

Lane lines

Classifications

120
Process the forward-facing video data, with one or more neural network models, to detect lane lines in the forward-facing video data and to determine classifications for the lane lines Neural network models Forward-facing video data Video system
110

125

Utilize the forward-facing video data to generate a histogram of horizontal positions of the vehicle relative to closest left and right lane lines Histogram Generate histogram Forward-facing video data Video system 110

100

130

Utilize a Gaussian mixture model to fit Gaussian probability density functions on the histogram and to calculate a mean and a standard deviation associated with the histogram Mean Standard deviation Gaussian probability density functions Calculate mean and standard deviation Histogram Video system 110

100

100

135

Utilize the mean and the standard deviation to identify a crossing interval for classifying a lane crossing for the vehicle Crossing interval Identify crossing interval Video system 110

Standard deviation

Mean

Crossing interval

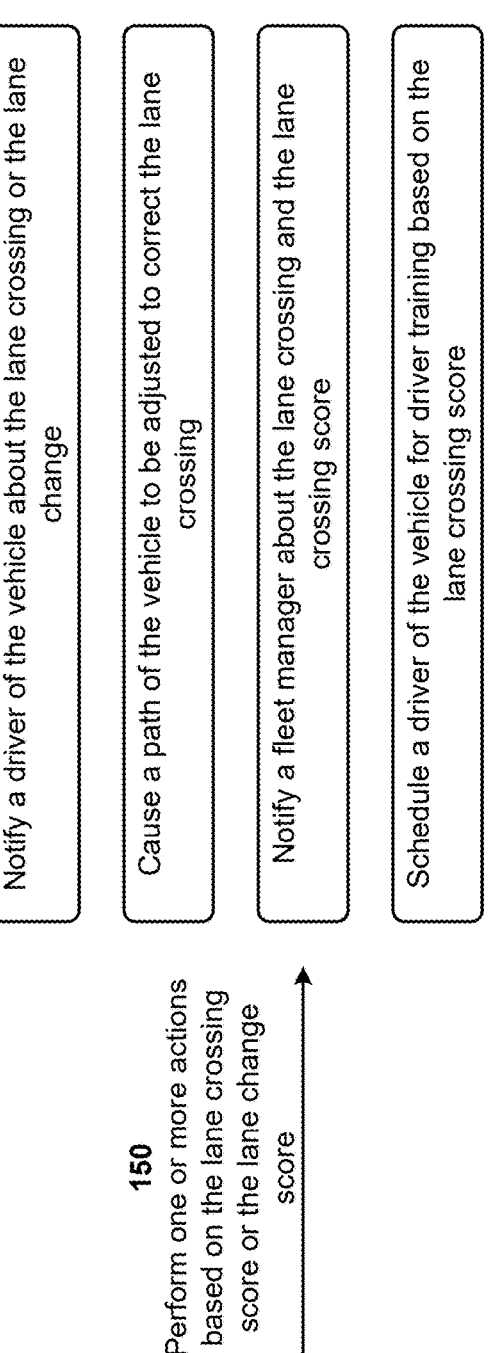

150
Perform one or more actions based on the lane crossing score or the lane change score Notify a driver of the vehicle about the lane crossing or the lane change Cause a path of the vehicle to be adjusted to correct the lane crossing Notify a fleet manager about the lane crossing and the lane crossing score Schedule a driver of the vehicle for driver training based on the lane crossing score Retrain the one or more neural network models based on the lane crossing score or the lane change score Video system 110

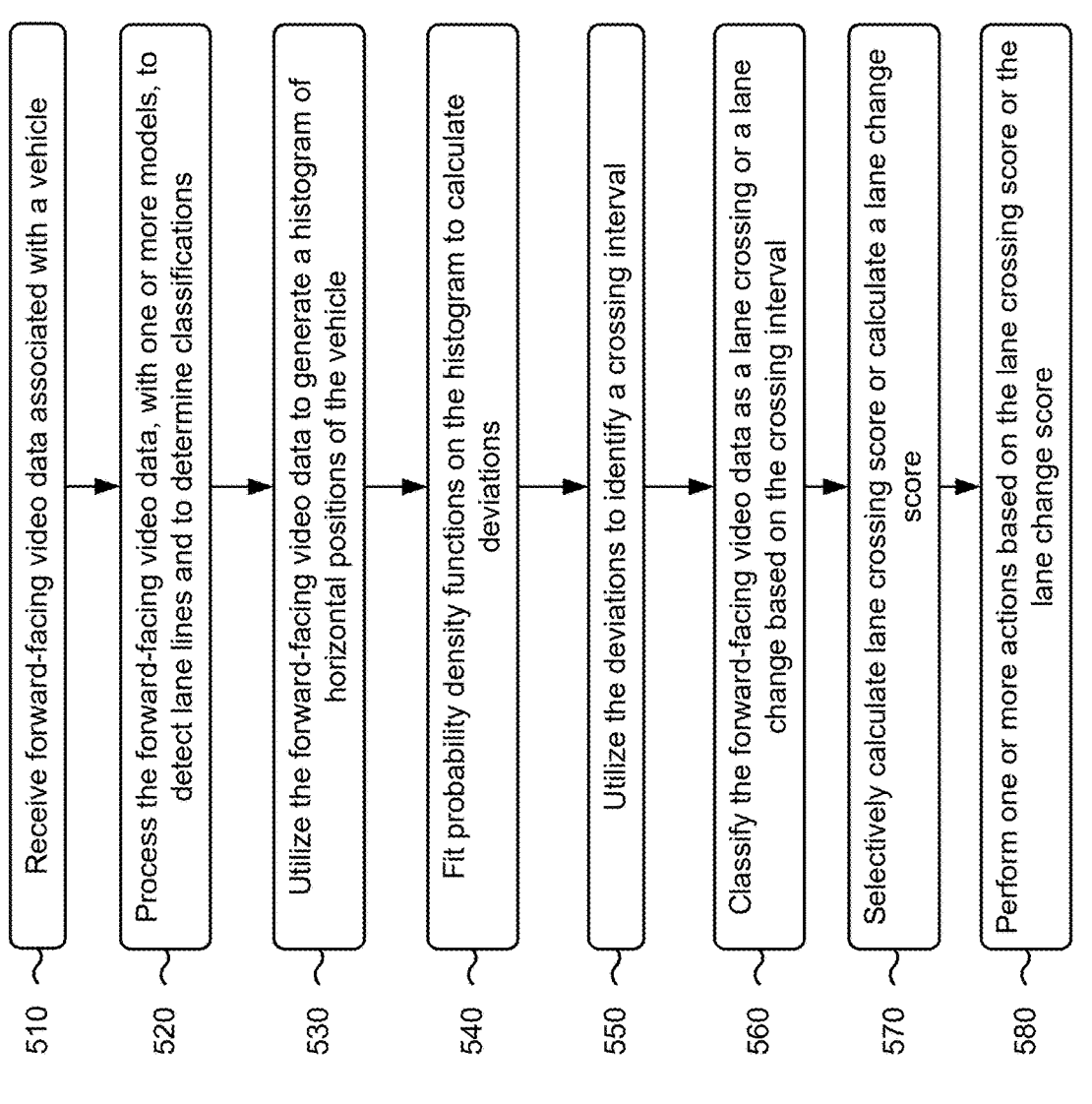

510 — Receive forward-facing video data associated with a vehicle

520 — Process the forward-facing video data, with one or more models, to detect lane lines and to determine classifications 530 — Utilize the forward-facing video data to generate a histogram of horizontal positions of the vehicle 540 — Fit probability density functions on the histogram to calculate deviations 550 — Utilize the deviations to identify a crossing interval 560 — Classify the forward-facing video data as a lane crossing or a lane change based on the crossing interval 570 — Selectively calculate lane crossing score or calculate a lane change score 580 — Perform one or more actions based on the lane crossing score or the lane change score

SYSTEMS AND METHODS FOR DETECTING LANE CROSSINGS AND CLASSIFYING LANE CHANGES

BACKGROUND

A lane departure warning system alerts a driver when the driver's vehicle is drifting out of a current lane using notifications, e.g. visual, vibratory, audio warnings, and/or the like.

BRIEF DESCRIPTION OF THE DRAWINGS

FIGS. 1A-1H are diagrams of an example associated with detecting lane line crossings and classifying lane changes.

FIG. 5 is a flowchart of an example process for detecting lane line crossings and classifying lane changes.

DETAILED DESCRIPTION OF EXAMPLE EMBODIMENTS

Figure 1A:
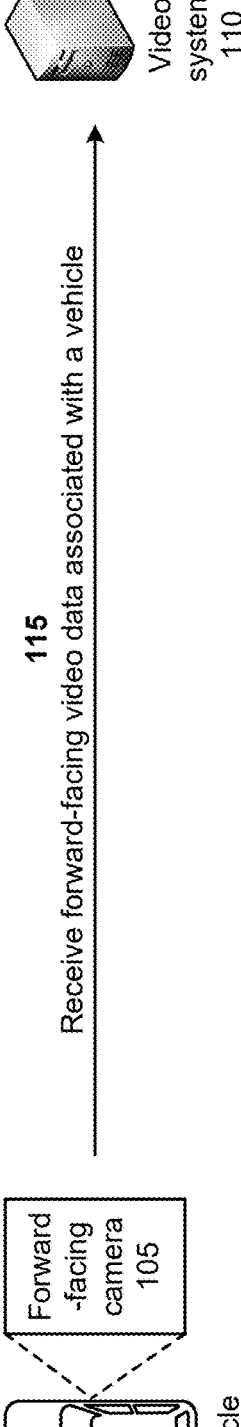
Figure 1A:

The following detailed description of example implementations refers to the accompanying drawings. The same reference numbers in different drawings may identify the same or similar elements.

Current lane departure warning systems detect vehicle lane drift based on knowledge of a width of the vehicle and a mounting position of a vehicle camera (e.g., a height of the vehicle camera, a distance of the vehicle camera from a side of the vehicle, and/or the like). Often, this step of determining exact camera positioning is a lengthy calibration process and tends to be error prone. A lane departure warning system may detect whether a vehicle is crossing or traveling on top of a road line and whether the road line is legally crossable. However, determining whether the vehicle is crossing or traveling on top of a solid road line or a dashed road line requires use of complex and specific knowledge of the vehicle width and positioning of vehicle cameras. For example, if a vehicle camera gets misaligned, the current approaches fail to provide accurate vehicle lane drift calculations. Thus, current techniques for detecting vehicle lane drift consume computing resources (e.g., processing resources, memory resources, communication resources, and/or the like), networking resources, and/or other resources associated with failing to provide accurate vehicle lane drift calculations, erroneously warning a driver of the vehicle based on inaccurate vehicle lane drift calculations, erroneously adjusting a path of the vehicle based on inaccurate vehicle lane drift calculations, and/or the like.

Some implementations described herein provide a video system that detects lane line crossing and classifies lane changes without the use of an explicitly known position of a mounted camera and the excessive calibration that entails. For example, the video system may receive forward-facing video data associated with a vehicle, and may process the forward-facing video data, with one or more neural network models, to detect lane lines in the forward facing video data and to determine classifications for the lane lines. The video system may utilize the forward-facing video data to generate a histogram of horizontal positions of the vehicle relative to closest left and right lane lines, and may fit probability density functions on the histogram to calculate a mean and a standard deviation associated with the histogram. The video system may utilize the mean and the standard deviation to identify a crossing interval, and may classify the forward facing video data as a lane crossing or a lane change based on the crossing interval. The video system may selectively calculate a lane crossing score based on classifying the forward facing video data as the lane crossing, or calculate a lane change score based on classifying the forward facing video data as the lane change. The video system may perform one or more actions based on the lane crossing score or the lane change score.

In this way, the video system detects lane line crossings and classifies lane changes. For example, the video system may classify lane lines, lane crossings, and lane change events based on forward facing video data captured by a forward facing video camera (e.g., a dashcam) mounted on a vehicle. The video system may perform an after the fact analysis of the lane crossings and lane change events to determine violations to enrich crash reconstruction analysis, and/or the like. The video system may utilize forward facing video data captured by a forward facing video camera in any mounting position (e.g., at different heights, at different angles, and/or the like), without knowledge of the position of the forward facing video camera and a width of the vehicle, and without performing a manual calibration. The video system may be self-calibrating, adaptive, and vision based (e.g., does not require additional data from sensors, such as an accelerometer or a gyroscope). Thus, the video system may conserve computing resources, networking resources, and/or other resources that would have otherwise been consumed by failing to provide accurate vehicle lane drift calculations, erroneously warning a driver of the vehicle based on inaccurate vehicle lane drift calculations, erroneously adjusting a path of the vehicle based on inaccurate vehicle lane drift calculations, and/or the like.

FIGS. 1A-1H are diagrams of an example 100 associated with detecting lane line crossings and classifying lane changes. As shown in FIGS. 1A-1H, example 100 includes a forward facing camera 105 associated with a vehicle and a video system 110. The forward facing camera 105 may capture video data associated objects (e.g., pedestrians, traffic signs, traffic signals, road markers, and/or the like) appearing in front of the vehicle. The video system 110 may include a system that detects lane line crossings and classifies lane changes. Further details of the forward facing camera 105 and the video system 110 are provided elsewhere herein. Although implementations described herein depict a single vehicle and a single forward facing camera 105, in some implementations, the video system 110 may be associated with multiple vehicles and/or multiple forward facing cameras 105. Furthermore, although the video system 110 is described as performing the implementations described herein, one or more other devices (e.g., the forward facing camera 105, a multi-access edge computing (MEC) device, and/or the like) may perform one or more of the implementations described herein.

The term "crossable," as used herein, may refer to a lane line that can be legally crossed by a vehicle (e.g., a dashed lane line). The term "non-crossable," as used herein, may refer to a lane line that cannot be legally crossed by a vehicle (e.g., a solid lane line). The term "crossing," as used herein, may refer to when a vehicle has substantially crossed a lane line (e.g., when a lane line is under a vehicle center or under a centermost percentage (e.g., 70%) of a vehicle width). The term "drifting," as used herein, may refer to when a vehicle is touching a lane line with a tire or has only slightly crossed the lane line (e.g., when the lane line is under an outermost percentage (e.g., 15%) of a vehicle width on each side). The term "lane change," as used herein, may refer to when a vehicle changes a lane by crossing a lane line. The term "lane departure," as used herein may refer to when a vehicle is over a lane line without changing a lane (e.g., slightly crossing the lane line) or when a vehicle stops a lane change after starting a lane change.

As shown in FIG. 1A, and by reference number 115, the video system 110 may receive forward facing video data associated with a vehicle. For example, the forward facing camera 105 may capture the forward facing video data associated with the vehicle. The forward facing video data may include video data identifying objects appearing in front of the vehicle over a time period associated with operation of the vehicle. The forward facing camera 105 may continuously provide the forward facing video data to the video system 110 over the time period associated with operation of the vehicle, may periodically provide the forward facing video data to the video system 110 after the time period associated with operation of the vehicle, may provide the forward facing video data to the video system 110 based on receiving a request for the forward facing video data from the video system 110, and/or the like. The video system 110 may receive the forward facing video data from the forward facing camera 105.

Figure 1B:
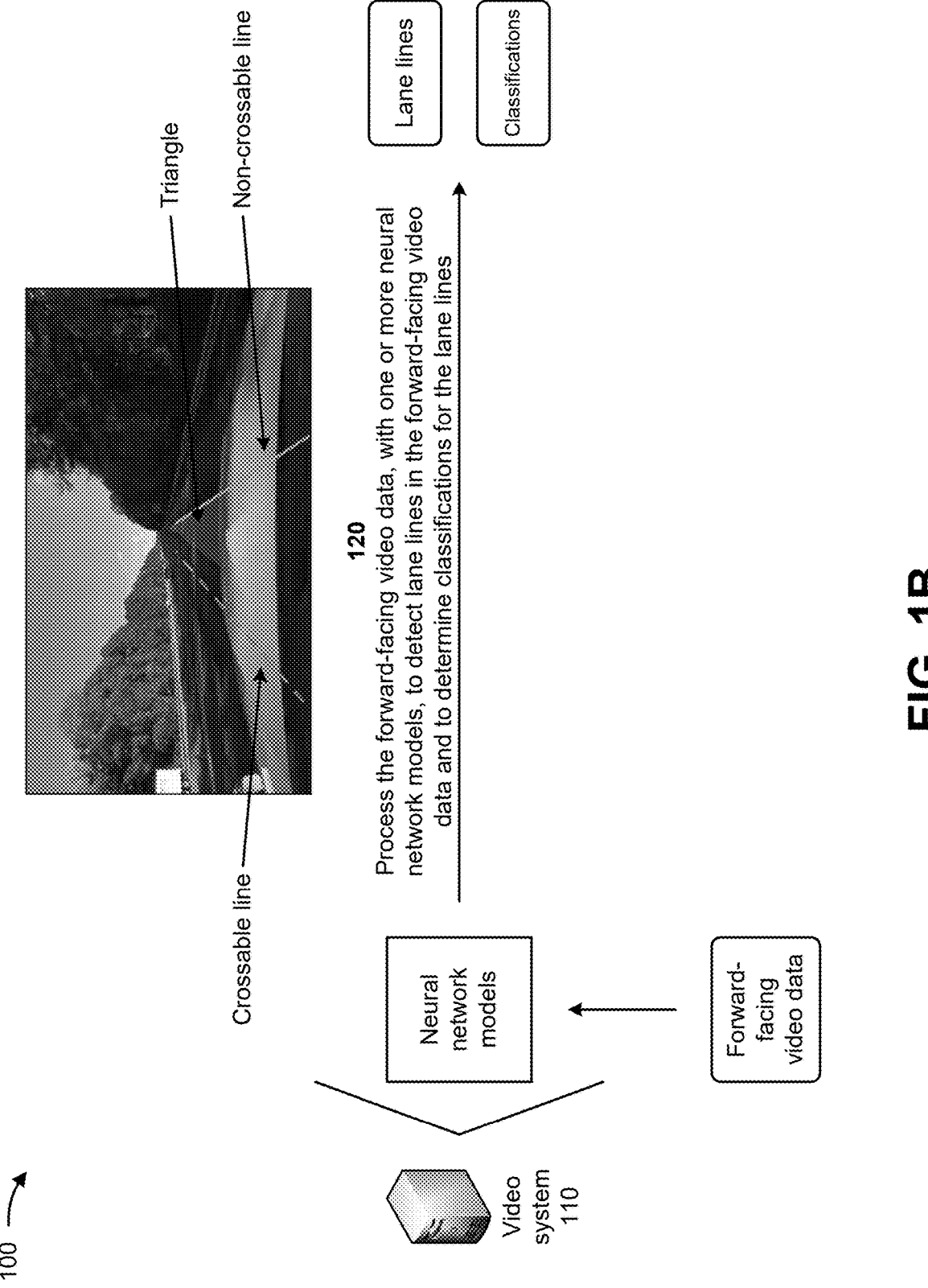

As shown in FIG. 1B, and by reference number 120, the video system 110 may process the forward facing video data, with one or more models (e.g., one or more neural network models), to detect lane lines in the forward facing video data and to determine classifications for the lane lines. For example, the video system 110 may be associated with one or more models (e.g., neural network models), such as an anchor-based network model (e.g., a CLRNet model), a row-based network model (e.g., a CondLaneNet model), and/or the like. The video system 110 may utilize the CLRNet model with reference datasets for lane line detection, and may utilize the CondLaneNet model with a dataset that includes lane line categories (e.g., OpenLane). The video system 110 may train and fine tune the CLRNet model and the CondLaneNet model with a dataset that includes dashcam images in order to improve lane line detection robustness and performance with real data.

In some implementations, the video system 110 may modify the CLRNet model and the CondLaneNet model to include a classification head that classifies each lane line as crossable or non-crossable. For example, as further shown in FIG. 1B, the video system 110 may detect two lane lines in a frame of the forward facing video data. The video system 110 may classify a left lane line as crossable (e.g., a dashed lane line) and may classify a right lane line as non-crossable (e.g., a solid lane line). A triangle in the frame may represent a projected occupancy region of the vehicle. For example, if the vehicle moves forward along the road, the triangle may define an area of the road that will be under the vehicle. If one of the lane lines intersects the triangle, the vehicle may be crossing the lane line (e.g., drifting). Further details of training a neural network model are provided below in connection with FIG. 2.

Figure 1C:
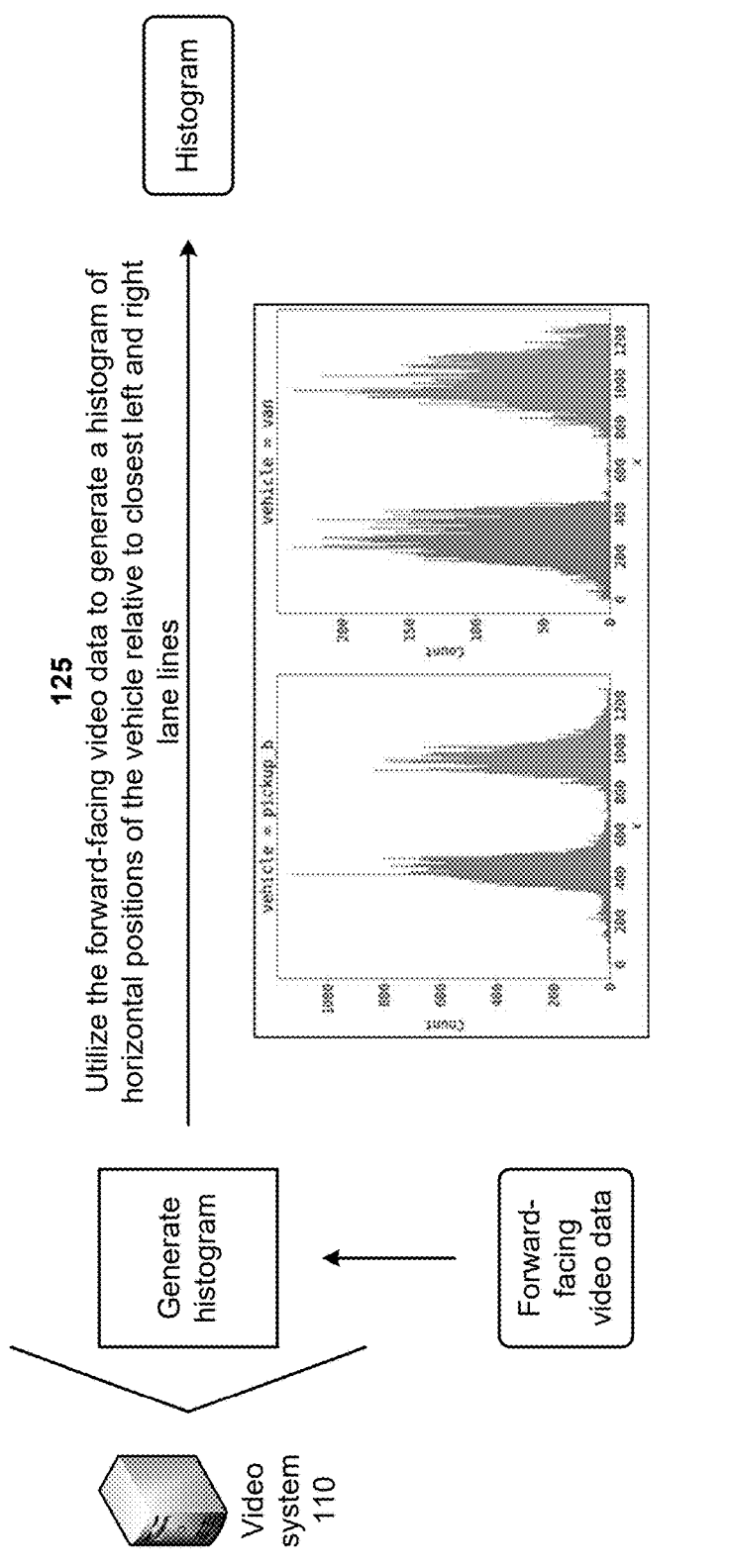

As shown in FIG. 1C, and by reference number 125, the video system 110 may utilize the forward facing video data to generate a histogram of horizontal positions of the vehicle relative to closest left and right lane lines. For example, the video system 110 may detect lane line crossings based on the detected lane lines and the classifications for the lane lines. However, instead of estimating the projected occupancy region of the vehicle (e.g., the triangle in FIG. 1B) to detect the lane line crossings, the video system 110 may utilize a statistical analysis of horizontal positions of the vehicle relative to the lane lines (e.g., the closest left and right lane lines) detected over time. This may include a calibration phase, for each vehicle, in which the video system 110 gathers enough data (e.g., ten, twenty, and/or the like minutes of the forward facing video data) to be utilized to assess whether the vehicle is crossing a lane line.

During the calibration phase, the video system 110 may collect data on horizontal positions (e.g., x positions) of the closest left lane line and right lane line detected in a frame of the forward facing video data, and may utilize the horizontal positions of the closest left lane line and right lane line to generate a histogram, as further shown in FIG. 1C (e.g., which depicts example histograms for two different vehicles (e.g., a pickup and a van) with different forward facing camera 105 mounting positions). The closest left and right lane lines may be defined as the lane lines whose distance with respect to the center of the image on the left side and the right side is a minimum (e.g., assuming the forward facing camera 105 is centered in the vehicle) and is less than a threshold value. The video system 110 may extract x coordinates at a bottom of the frame since such a location provides robust lane line crossing information.

Figure 1D:
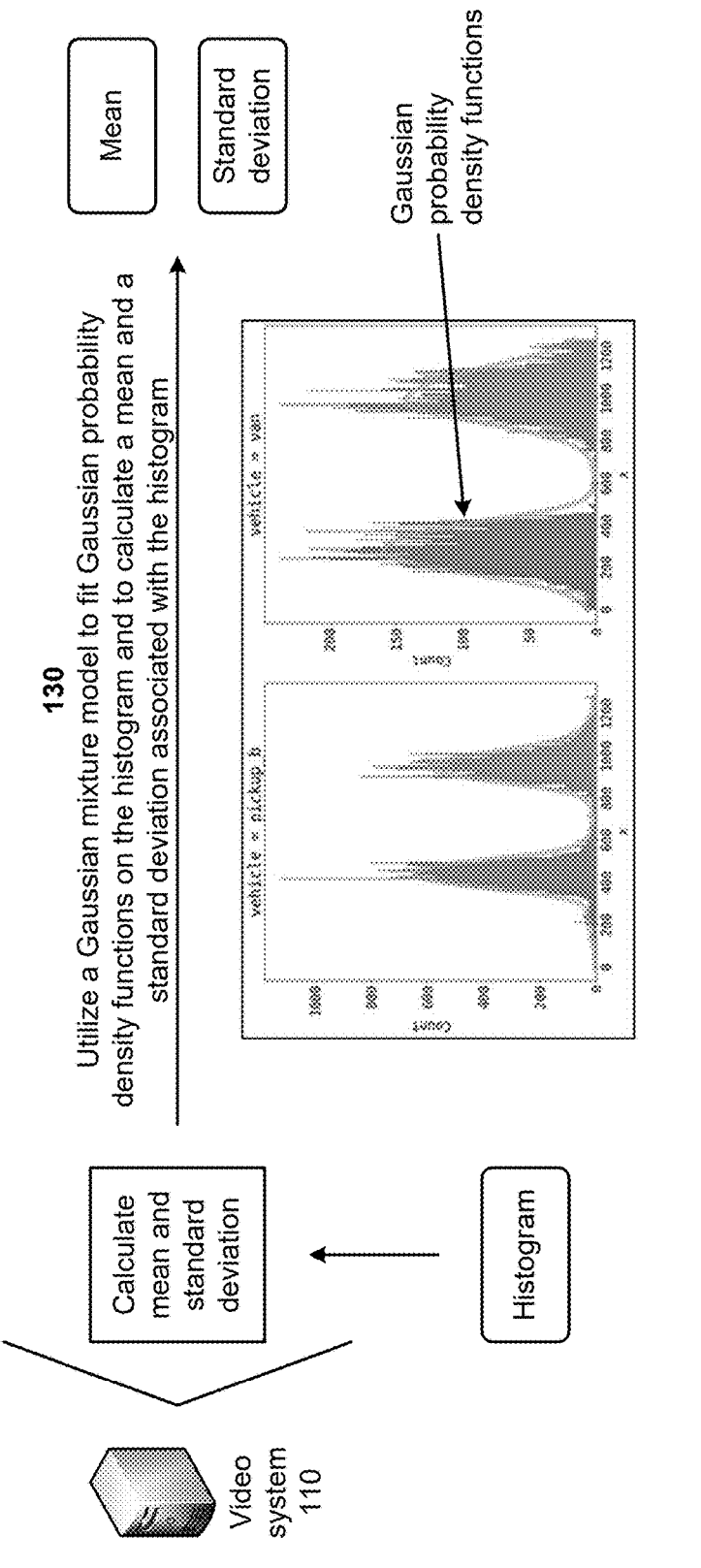

As shown in FIG. 1D, and by reference number 130, the video system 110 may utilize a Gaussian mixture model (for example) to fit Gaussian probability density functions on the histogram and to calculate a mean and a standard deviation associated with the histogram. For example, the video system 110 may fit probability density functions on the histogram to calculate the mean and the standard deviation associated with the histogram. In some implementations, when fitting the probability density functions on the histogram to calculate the mean and the standard deviation associated with the histogram, the video system 110 may fit one or more Gaussian probability density functions on the histogram to calculate the mean and the standard deviation associated with the histogram. In some implementations, when fitting the probability density functions on the histogram to calculate the mean and the standard deviation associated with the histogram, the video system 110 may utilize a Gaussian mixture model to fit one or more Gaussian probability density functions on the histogram and to calculate the mean and the standard deviation associated with the histogram.

For example, as further shown in FIG. 1D, the video system 110 may utilize a Gaussian mixture model to fit Gaussian probability density functions on the histogram in order to compute the mean (u) and the standard deviation (o) associated with the histogram. The video system 110 may assume that the vehicle typically drives a majority of the time inside a lane. Thus, two peaks of the bimodal distribution may represent where the lane lines should appear in a frame of the forward facing video data when the vehicle is driving inside a lane. After fitting the bimodal distribution on the histogram, the video system 110 may detect a lane line crossing based on detecting when a line appears, with reasonably high confidence, in an area provided between the two peaks.

Figure 1E:
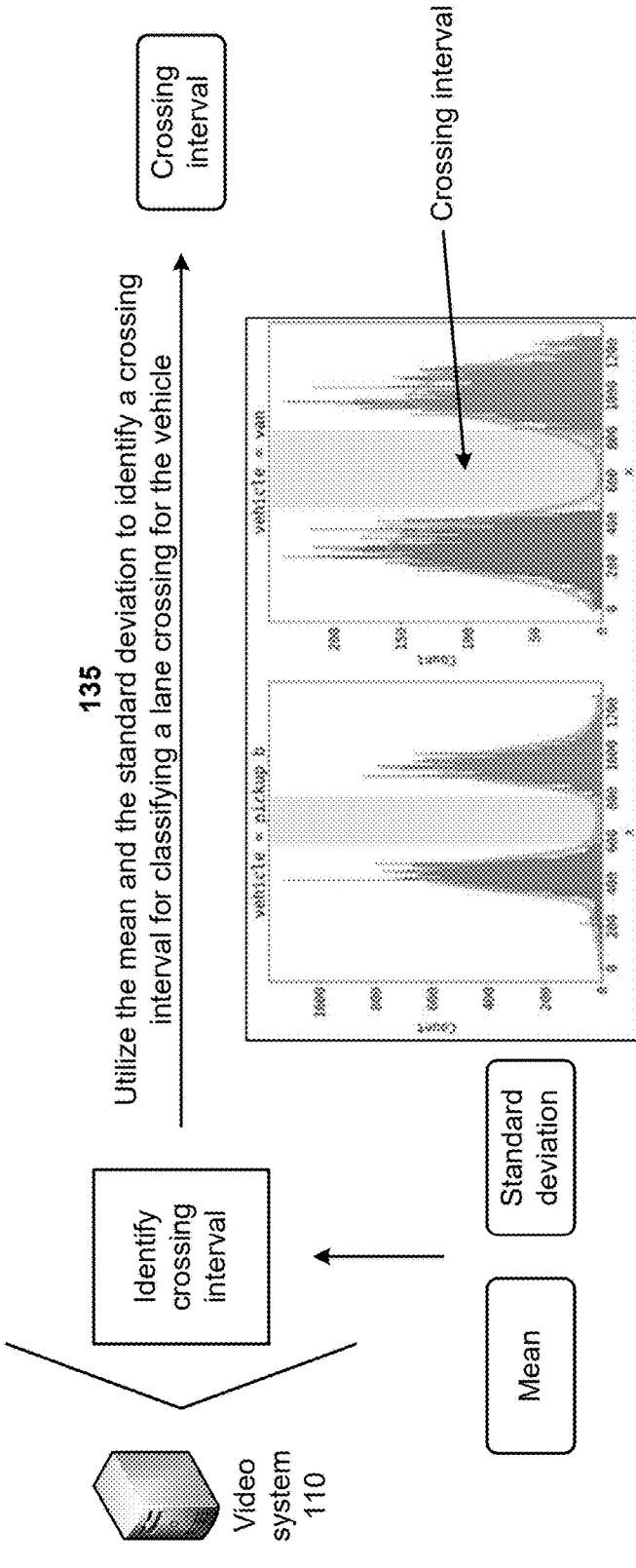

As shown in FIG. 1E, and by reference number 135, the video system 110 may utilize the mean and the standard deviation to identify a crossing interval for classifying a lane crossing for the vehicle. For example, given the bimodal distribution parameters (e.g., the mean and the standard deviation), the video system 110 may calculate the crossing interval as an interval where a horizontal value (x) at a bottom of a frame of a lane line is shown in order to be classified as crossing. In some implementations, the video system 110 may calculate the crossing interval as follows:

$$[\mu_{left} + k_{left} * \sigma_{left}, \mu_{right} - k_{right} * \sigma_{right}],$$

where $k_{left}=k_{right}=k$ to reduce a quantity of hyper parameters. The crossing interval is further shown in the histogram of the van, as depicted in FIG. 1E. The video system 110 may utilize the crossing interval for identifying and classifying a lane crossing of the vehicle, as described below.

Figure 1F:
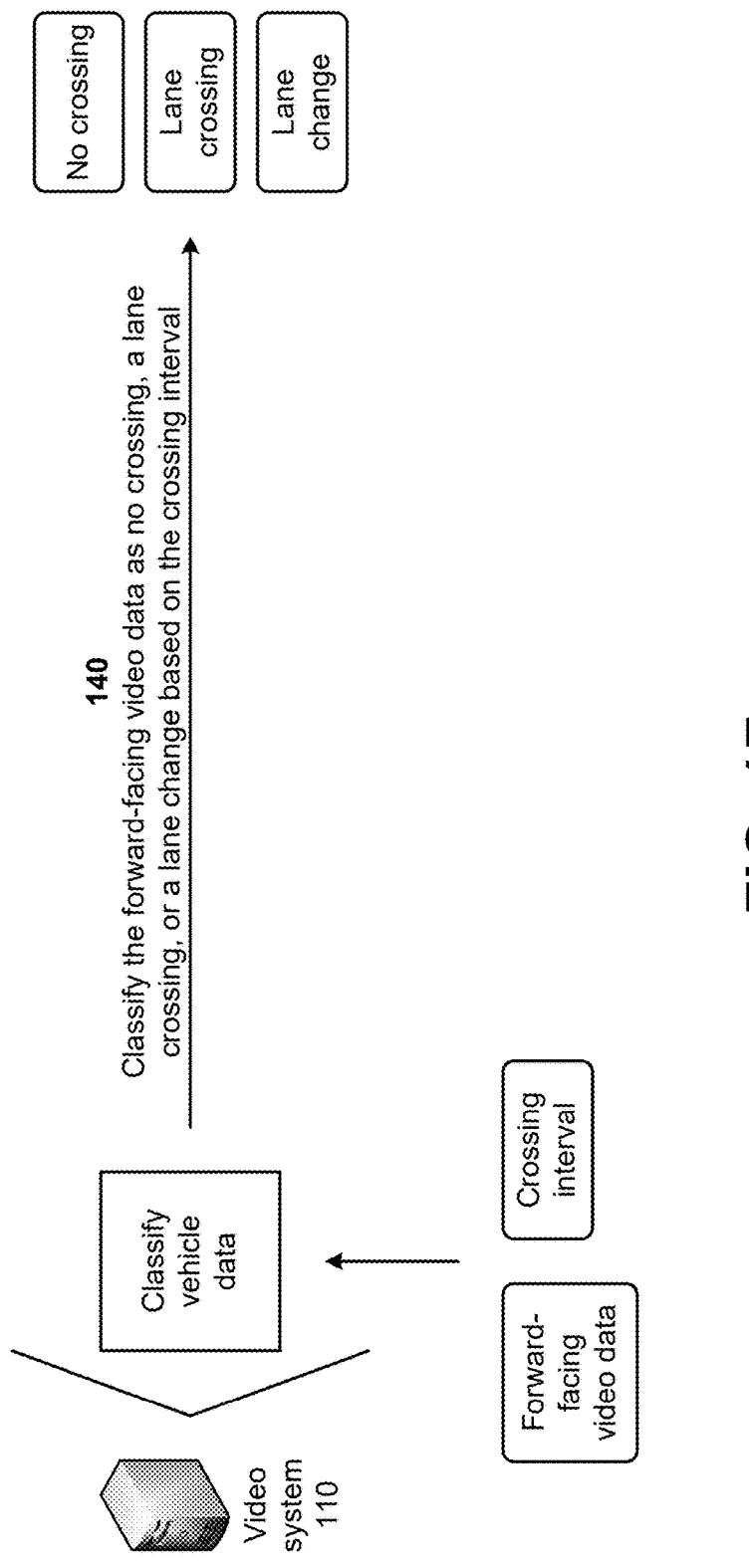

As shown in FIG. 1F, and by reference number 140, the video system 110 may classify the forward facing video data as no crossing, a lane crossing, or a lane change based on the crossing interval. For example, the video system 110 may classify each frame of the forward facing video data as no crossing, a lane crossing, or a lane change based on the crossing interface. In some implementations, the video system 110 may classify each frame of the forward facing video data as no crossing when a lane line does not exist within the crossing interval. Alternatively, the video system 110 may classify each frame of the forward facing video data as a lane crossing when a lane line exists with a horizontal value (x) at a bottom of the frame that is within the crossing interval. Alternatively, the video system 110 may classify the forward facing video data as a lane change when the lane line moves through the crossing interval over time.

Such a procedure may generate a sequence of crossing events. For each crossing event, the video system 110 may determine a starting frame and an ending frame of the forward facing video data, as well as a lane line type (e.g., crossable or non-crossable). A single crossing event may be fragmented due to missed crossing detections, and there may be gaps between these fragments. In order to fill these gaps, the video system 110 may join the fragments together if a quantity of the missed crossing detections between the fragments is lower than a threshold that may be tuned based on a neural network model (e.g., a threshold of six may be utilized for the CLRNet model and a threshold of twelve for the CondLaneNet model).

Figure 1G:
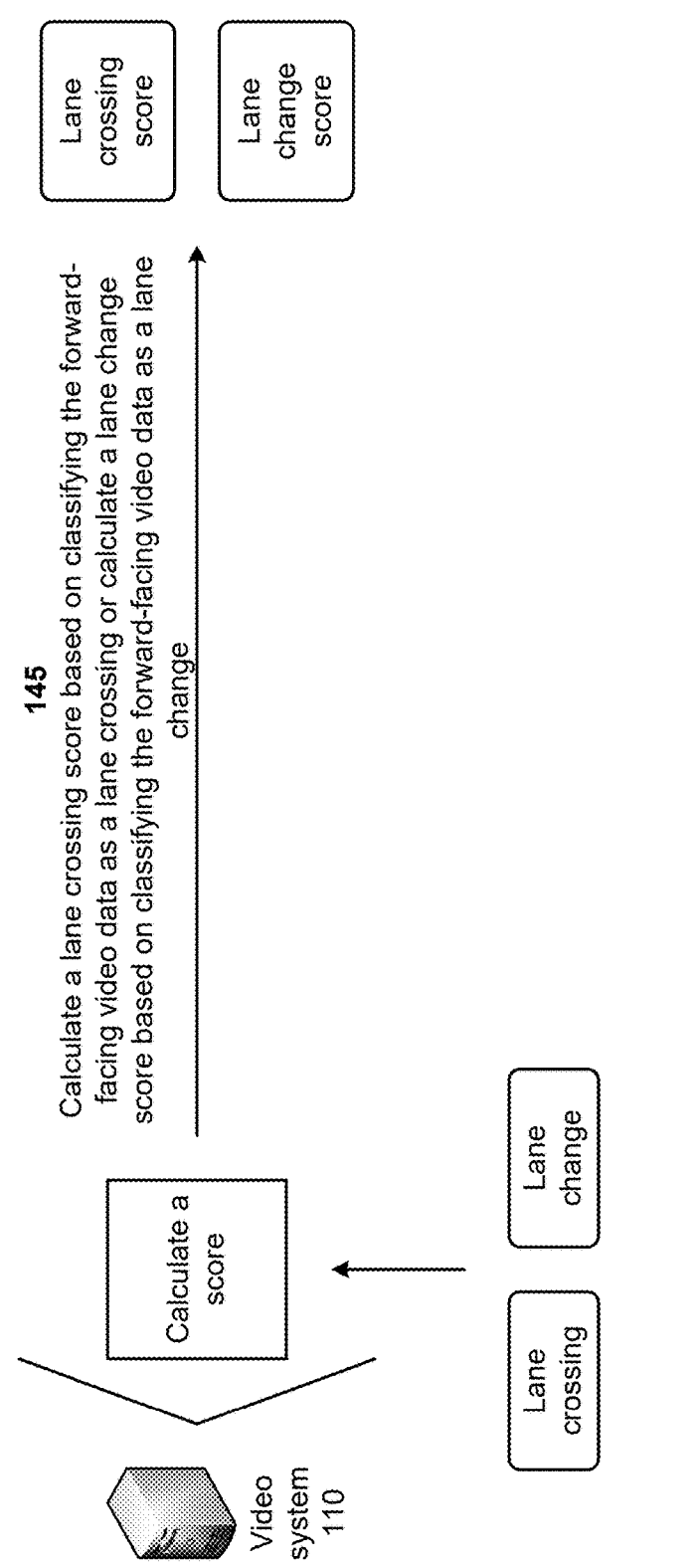

As shown in FIG. 1G, and by reference number 145, the video system 110 may calculate a lane crossing score based on classifying the forward facing video data as a lane crossing or may calculate a lane change score based on classifying the forward facing video data as a lane change. For example, when the video system 110 classifies the forward facing video data as a lane crossing, the video system 10 may calculate the lane crossing score for the lane crossing. Alternatively, when the video system 110 classifies the forward facing video data as a lane change, the video system 10 may calculate the lane change score for the lane change. In some implementations, the video system 110 may calculate a score for each per-frame classification (e.g., a lane crossing or a lane change), given a left ($x_l$) boundary value and a right ($x_r$) boundary value of the crossing interval, using the following two exemplary linear functions:

$$y = \frac{0.5}{x_m - x_l}(x - x_l) + 0.5, \, x \le x_m$$

$$y = \frac{0.5}{x_m - x_r}(x - x_r) + 0.5, \, x > x_m,$$

where $x_m$ is a center of an interval $$x_m = \frac{(x_l + x_r)}{2}.$$

In some implementations, the video system 110 may utilize the probability density function of the two fitted Gaussians. For example, given a value of the probability density function at the left and right means (e.g., $p_l$ and $p_r$), the video system 110 may calculate a score as follows:

$$f(x) = 1 - p(x)/\max\{p_l, p_r\},$$

where $p_x$ is the value of the probability density function at x, and where scores outside the crossing interval are set to zero. Thus, each crossing event may be associated with a score that is an aggregation (e.g., a maximum value) of all per-frame scores within the crossing event. Therefore, given forward facing video data, the video system 110 may determine crossing classifications per frame, and may aggregate the crossing classifications into crossing events with a temporal extent (e.g., a start frame and an end frame) and with a crossing type and a score.

In some implementations, the video system 110 is customizable to the needs of an end user and may be configured to discard short crossing events based on a threshold length (e.g., a minimum length of frames, a percentile of frames, and/or the like). In some implementations, the video system 110 may linearly change the factor k and the score threshold in order change how the video system 110 performs based on customer requirements (e.g., a customer may want to be more precise but with fewer detections, a customer may want to increase lane crossing warnings even if some are false positives, and/or the like).

In some implementations, in order to classify lane change events, the video system 110 may determine a minimum distance threshold for a lane change as more than half a length of a classification interval. Therefore, the video system 110 may calculate an absolute difference between an x coordinate of a first and a last lane line crossing in a crossing event and may compare the absolute difference and the minimum distance threshold as follows:

$|x_0-x_n|<$minimum distance threshold (e.g., indicates a lane departure), or $| x_0-x_n|\geq$minimum distance threshold (e.g., indicates a lane change).

In some implementations, the video system 110 may determine whether first and last x coordinates are on the same side with respect to an image center in order to classify lane change events.

As shown in FIG. 1H, and by reference number 150, the video system 110 may perform one or more actions based on the lane crossing score of the lane change score. In some implementations, performing the one or more actions includes the video system 110 notifying a driver of the vehicle about the lane crossing or the lane change. For example, when the video system 110 detects a lane crossing or a lane change, the video system 110 may generate a notification identifying the lane crossing or the lane change. The video system 110 may provide the notification to the vehicle, and the vehicle may provide (e.g., display, audibly provide, and/or the like) the notification to the driver of the vehicle. In this way, the video system 110 conserves computing resources, networking resources, and/or other resources that would have otherwise been consumed by failing to provide accurate vehicle lane drift calculations.

In some implementations, performing the one or more actions includes the video system 110 causing a path of the vehicle to be adjusted to correct the lane crossing. For example, when the video system 110 detects a lane crossing, the video system 110 may generate driving instructions to correct the lane crossing. The video system 110 may provide the driving instructions to the vehicle to cause a path of the vehicle to be adjusted to correct the lane crossing. In this way, the video system 110 conserves computing resources, networking resources, and/or other resources that would have otherwise been consumed by erroneously adjusting a path of the vehicle based on inaccurate vehicle lane drift calculations.

In some implementations, performing the one or more actions includes the video system 110 notifying a fleet manager about the lane crossing and the lane crossing score. For example, when the video system 110 detects a lane crossing and calculates the lane crossing score, the video system 110 may generate a notification identifying the lane crossing and the lane crossing score. The video system 110 may provide the notification to a user device associated with a fleet manager of the vehicle. The user device may provide (e.g., display, audibly provide, and/or the like) the notification to the fleet manager and the fleet manager may discuss the issue with the driver of the vehicle. In this way, the video system 110 conserves computing resources, networking resources, and/or other resources that would have otherwise been consumed by erroneously warning a fleet manager of the vehicle based on inaccurate vehicle lane drift calculations.

In some implementations, performing the one or more actions includes the video system 110 scheduling a driver of the vehicle for driver training based on the lane crossing score. For example, when the video system 110 detects a lane crossing and calculates a poor lane crossing score for the lane crossing, the video system 110 may determine that the driver of the vehicle needs training (e.g., defensive driving lessons) in order to improve the driver's driving. The video system 110 may schedule the driver for driver training and may inform the driver about the scheduled driver training. In this way, the video system 110 conserves computing resources, networking resources, and/or other resources that would have otherwise been consumed by failing to provide accurate vehicle lane drift calculations, handling accidents caused by poor driving, and/or the like.

In some implementations, performing the one or more actions includes the video system 110 retraining the one or more neural network models based on the lane crossing score or the lane change score. For example, the video system 110 may utilize the lane crossing score or the lane change score as additional training data for retraining the one or more neural network models, thereby increasing the quantity of training data available for training the one or more neural network models. Accordingly, the video system 110 may conserve computing resources associated with identifying, obtaining, and/or generating historical data for training the one or more neural network models relative to other systems for identifying, obtaining, and/or generating historical data for training machine learning models.

In this way, the video system 110 detects lane line crossings and classifies lane changes. For example, the video system 110 may classify lane lines, lane crossings, and lane change events based on forward facing video data captured by a forward facing video camera (e.g., a dashcam) mounted on a vehicle. The video system 110 may perform an after the fact analysis of the lane crossings and lane change events to determine violations to enrich crash reconstruction analysis, and/or the like. The video system 110 may utilize forward facing video data captured by a forward facing video camera in any mounting position (e.g., at different heights, at different angles, and/or the like), without knowledge of the position of the forward facing video camera and a width of the vehicle, and without performing a manual calibration. The video system 110 may be self-calibrating, adaptive, and vision based (e.g., does not require additional data from sensors, such as an accelerometer or a gyroscope). Thus, the video system 110 may conserve computing resources, networking resources, and/or other resources that would have otherwise been consumed by failing to provide accurate vehicle lane drift calculations, erroneously warning a driver of the vehicle based on inaccurate vehicle lane drift calculations, erroneously adjusting a path of the vehicle based on inaccurate vehicle lane drift calculations, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
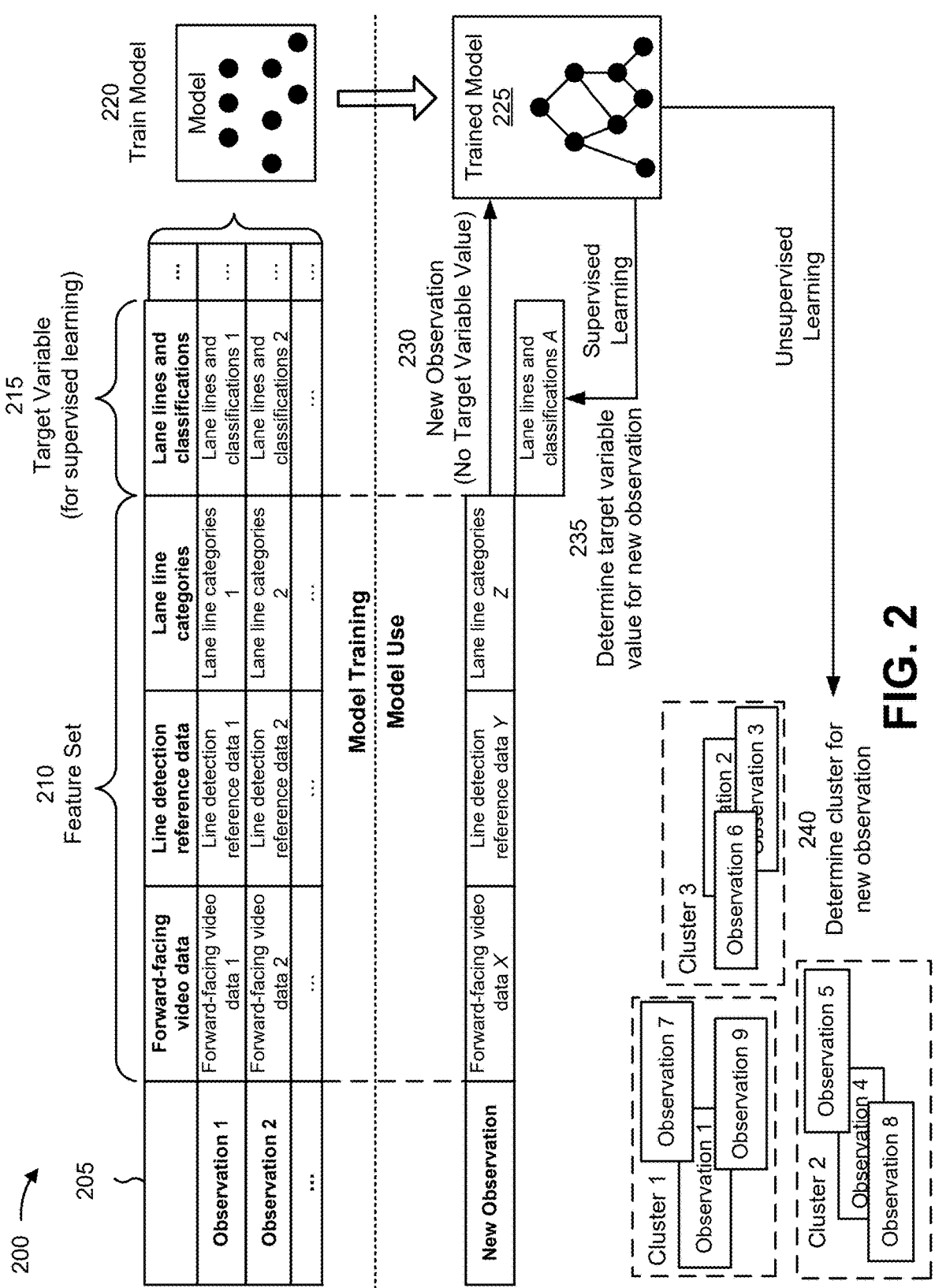
FIG. 2 is a diagram illustrating an example of training and using a machine learning model.

FIG. 2 is a diagram illustrating an example 200 of training and using a machine learning model for detecting and classifying lane lines. The machine learning model training and usage described herein may be performed using a machine learning system. The machine learning system may include or may be included in a computing device, a server, a cloud computing environment, and/or the like, such as the video system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the video system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the video system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of forward facing video data, a second feature of line detection reference data, a third feature of lane line categories, and so on. As shown, for a first observation, the first feature may have a value of forward facing video data 1, the second feature may have a value of line detection reference data 1, the third feature may have a value of lane line categories 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be entitled "lane lines and classifications" and may include a value of lane lines and classifications 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of forward facing video data X, a second feature of line detection reference data Y, a third feature of lane line categories Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of lane lines and classifications A for the target variable of the lane lines and classifications for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a forward facing video data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a line detection reference data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to detect and classify lane lines. The machine learning system enables recognition and/or identification of tens, hundreds, thousands, or millions of features and/or feature values for tens, hundreds, thousands, or millions of observations, thereby increasing accuracy and consistency and reducing delay associated with detecting and classifying lane lines relative to requiring computing resources to be allocated for tens, hundreds, or thousands of operators to manually detect and classify lane lines.

As indicated above, FIG. 2 is provided as an example. Other examples may differ from what is described in connection with FIG. 2.

Figure 3:
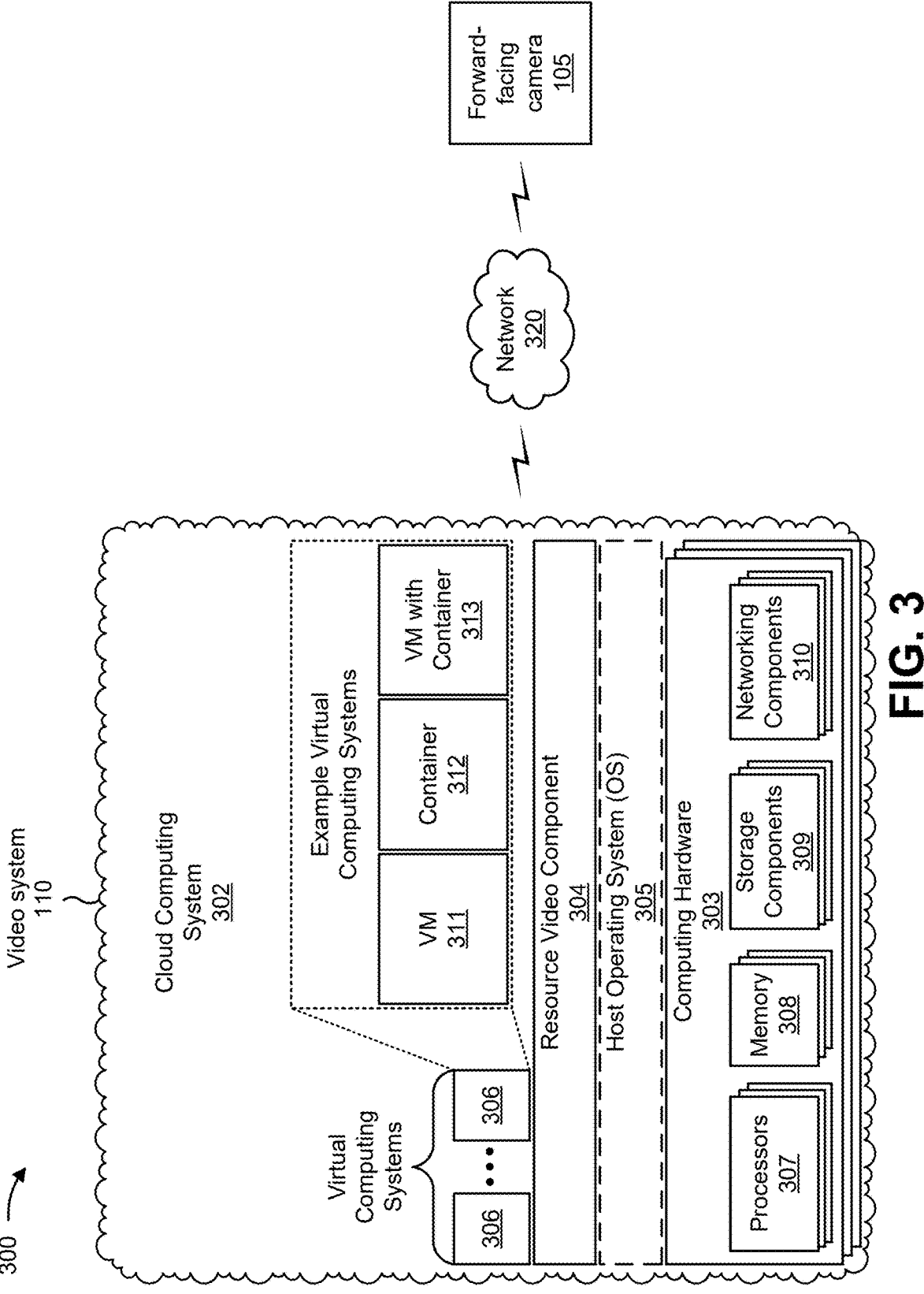
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the video system 110, which may include one or more elements of and/or may execute within a cloud computing system 302. The cloud computing system 302 may include one or more elements 303-313, as described in more detail below. As further shown in FIG. 3, the environment 300 may include the forward facing camera 105 and/or a network 320. Devices and/or elements of the environment 300 may interconnect via wired connections and/or wireless connections.

The forward facing camera 105 may include one or more devices capable of receiving, generating, storing, processing, providing, and/or routing information, as described elsewhere herein. The forward facing camera 105 may include a communication device and/or a computing device. For example, the forward facing camera 105 may include an optical instrument that captures videos (e.g., images and audio). The forward facing camera 105 may feed real-time video directly to a screen or a computing device for immediate observation, may record the captured video (e.g., images and audio) to a storage device for archiving or further processing, and/or the like. In some implementations, the forward facing camera 105 may include a dashcam of a vehicle.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the video system 110 may include one or more elements 303-313 of the cloud computing system 302, may execute within the cloud computing system 302, and/or may be hosted within the cloud computing system 302, in some implementations, the video system 110 may not be cloud-based (e.g., may be implemented outside of a cloud computing system) or may be partially cloud-based. For example, the video system 110 may include one or more devices that are not part of the cloud computing system 302, such as a device 400 of FIG. 4, which may include a standalone server or another type of computing device. The video system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
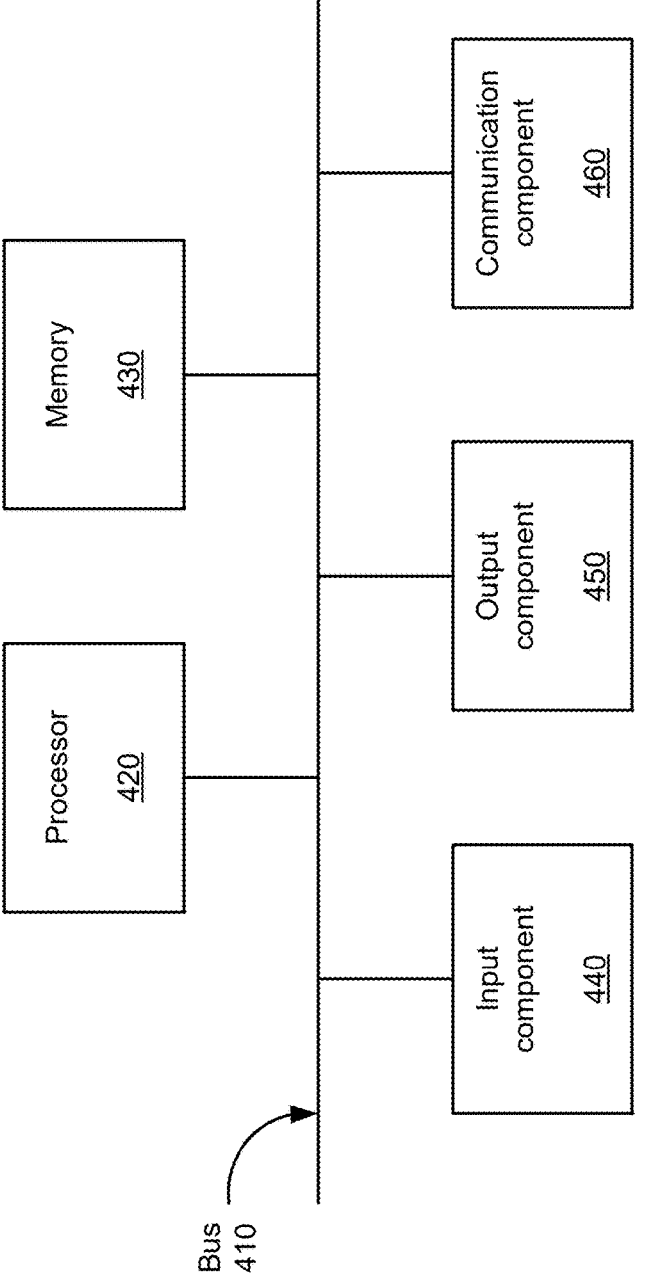
FIG. 4 is a diagram of example components of one or more devices of FIG. 3.

FIG. 4 is a diagram of example components of a device 400, which may correspond to the forward facing camera 105 and/or the video system 110. In some implementations, the forward facing camera 105 and/or the video system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 depicts a flowchart of an example process 500 for detecting lane line crossings and classifying lane changes. In some implementations, one or more process blocks of FIG. 5 may be performed by a device (e.g., the video system 110). In some implementations, one or more process blocks of FIG. 5 may be performed by another device or a group of devices separate from or including the device, such as a camera (e.g., the forward facing camera 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving forward facing video data associated with a vehicle (block 510). For example, the device may receive forward facing video data associated with a vehicle, as described above.

As further shown in FIG. 5, process 500 may include processing the forward facing video data, with one or more models, to detect lane lines and to determine classifications for the lane lines (block 520). For example, the device may process the forward facing video data, with one or more neural network models, to detect lane lines in the forward facing video data and to determine classifications for the lane lines, as described above. In some implementations, processing the forward facing video data, with the one or more models, to detect the lane lines in the forward facing video data and to determine the classifications for the lane lines includes processing the forward facing video data, lane line detection reference data, and lane line categories, with one or more neural network models, to detect the lane lines and to determine the classifications for the lane lines. In some implementations, the classifications for the lane lines include one or more of a classification for a crossable lane line, or a classification for a non-crossable lane line.

As further shown in FIG. 5, process 500 may include utilizing the forward facing video data to generate a histogram of horizontal positions of the vehicle (block 530). For example, the device may utilize the forward facing video data to generate a histogram of horizontal positions of the vehicle relative to closest left and right lane lines, as described above.

As further shown in FIG. 5, process 500 may include fitting probability density functions on the histogram to calculate deviations (block 540). For example, the device may fit probability density functions on the histogram to calculate deviations associated with the histogram, as described above. In some implementations, fitting the probability density functions on the histogram to calculate the deviations associated with the histogram includes fitting one or more Gaussian probability density functions on the histogram to calculate a mean and a standard deviation associated with the histogram. In some implementations, fitting the probability density functions on the histogram to calculate the deviations associated with the histogram includes utilizing a Gaussian mixture model to fit one or more Gaussian probability density functions on the histogram and to calculate a mean and a standard deviation associated with the histogram.

As further shown in FIG. 5, process 500 may include utilizing the deviations to identify a crossing interval (block 550). For example, the device may utilize the deviations to identify a crossing interval, as described above. In some implementations, utilizing the deviations to identify the crossing interval for classifying the lane crossing for the vehicle includes calculating the crossing interval based on the deviations associated with the histogram.

As further shown in FIG. 5, process 500 may include classifying the forward facing video data as a lane crossing or a lane change based on the crossing interval (block 560). For example, the device may classify the forward facing video data as a lane crossing or a lane change based on the crossing interval, as described above. In some implementations, classifying the forward facing video data as the lane crossing or the lane change based on the crossing interval includes one of classifying the forward facing video data as the lane crossing based on one or more lane lines of the forward facing video data being within the crossing interval, or classifying the forward facing video data as the lane change based on the one or more lane lines of the forward facing video data satisfying a distance threshold. In some implementations, classifying the forward facing video data as the lane crossing based on the crossing interval includes aggregating frames of the forward facing video data into one or more events, and classifying each of the one or more events as a lane crossing event based on the crossing interval.

As further shown in FIG. 5, process 500 may include selectively calculating a lane crossing score or calculating a lane change score (block 570). For example, the device may selectively calculate a lane crossing score based on classifying the forward facing video data as the lane crossing, or calculate a lane change score based on classifying the forward facing video data as the lane change, as described above. In some implementations, calculating the lane crossing score based on classifying the forward facing video data as the lane crossing includes utilizing a linear function to calculate the lane crossing score based on one or more boundary values associated with the forward facing video data.

As further shown in FIG. 5, process 500 may include performing one or more actions based on the lane crossing score or the lane change score (block 580). For example, the device may perform one or more actions based on the lane crossing score or the lane change score, as described above. In some implementations, performing the one or more actions includes generating a notification about the lane crossing, and providing the notification to a driver of the vehicle. In some implementations, performing the one or more actions includes generating driving instructions to correct the lane crossing, and providing the driving instructions to the vehicle to cause a path of the vehicle to be adjusted to correct the lane crossing. In some implementations, performing the one or more actions includes generating a notification about the lane crossing and the lane crossing score, and providing the notification to a fleet manager associated with the vehicle. In some implementations, performing the one or more actions includes one or more of scheduling a driver of the vehicle for driver training based on the lane crossing score, or retraining the one or more neural network models based on the lane crossing score.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
receiving, by a device, forward facing video data associated with a vehicle;
processing, by the device, the forward facing video data, with one or more models, to detect lane lines in the forward facing video data and to determine classifications for the lane lines;
utilizing, by the device, the forward facing video data to generate a histogram of horizontal positions of the vehicle relative to closest left and right lane lines;

fitting, by the device, probability density functions on the histogram to calculate deviations associated with the histogram;

utilizing, by the device, the deviations to identify a crossing interval;

classifying, by the device, the forward facing video data as a lane crossing or a lane change based on the crossing interval;

selectively:

calculating, by the device, a lane crossing score based on classifying the forward facing video data as the lane crossing, or calculating, by the device, a lane change score based on classifying the forward facing video data as the lane change; and performing, by the device, one or more actions based on the lane crossing score or the lane change score.

2. The method of claim 1, wherein processing the forward facing video data, with one or more models, to detect the lane lines in the forward facing video data and to determine the classifications for the lane lines comprises:

processing the forward facing video data, lane line detection reference data, and lane line categories, with one or more neural network models, to detect the lane lines and to determine the classifications for the lane lines.

3. The method of claim 1, wherein the classifications for the lane lines include one or more of:

a classification for a crossable lane line, or a classification for a non-crossable lane line.

4. The method of claim 1, wherein fitting the probability density functions on the histogram to calculate the deviations associated with the histogram comprises:

fitting one or more Gaussian probability density functions on the histogram to calculate a mean and a standard deviation associated with the histogram.

5. The method of claim 1, wherein fitting the probability density functions on the histogram to calculate the deviations associated with the histogram comprises:

utilizing a Gaussian mixture model to fit one or more Gaussian probability density functions on the histogram and to calculate a mean and a standard deviation associated with the histogram.

6. The method of claim 1, wherein utilizing the deviations to identify the crossing interval for classifying the lane crossing for the vehicle comprises:

calculating the crossing interval based on the deviations associated with the histogram.

7. The method of claim 1, wherein classifying the forward facing video data as the lane crossing or the lane change based on the crossing interval comprises one of:

classifying the forward facing video data as the lane crossing based on one or more lane lines of the forward facing video data being within the crossing interval; or classifying the forward facing video data as the lane change based on the one or more lane lines of the forward facing video data satisfying a distance threshold.

8. A device, comprising:

one or more processors configured to:

receive forward facing video data associated with a vehicle;

process the forward facing video data, with one or more neural network models, to detect lane lines in the forward facing video data and to determine classifications for the lane lines;

utilize the forward facing video data to generate a histogram of horizontal positions of the vehicle relative to closest left and right lane lines;

fit one or more probability density functions on the histogram to calculate a mean and a standard deviation associated with the histogram;

utilize the mean and the standard deviation to identify a crossing interval;

classify the forward facing video data as a lane crossing based on the crossing interval;

calculate a lane crossing score based on classifying the forward facing video data as the lane crossing; and perform one or more actions based on the lane crossing score.

9. The device of claim 8, wherein the one or more processors, to calculate the lane crossing score based on classifying the forward facing video data as the lane crossing, are configured to:

utilize a linear function to calculate the lane crossing score based on one or more boundary values associated with the forward facing video data.

10. The device of claim 8, wherein the one or more processors, to classify the forward facing video data as the lane crossing based on the crossing interval, are configured to:

aggregate frames of the forward facing video data into one or more events; and classify each of the one or more events as a lane crossing event based on the crossing interval.

11. The device of claim 8, wherein the one or more processors, to perform the one or more actions, are configured to:

generate a notification about the lane crossing; and provide the notification to a driver of the vehicle.

12. The device of claim 8, wherein the one or more processors, to perform the one or more actions, are configured to:

generate driving instructions to correct the lane crossing; and provide the driving instructions to the vehicle to cause a path of the vehicle to be adjusted to correct the lane crossing.

13. The device of claim 8, wherein the one or more processors, to perform the one or more actions, are configured to:

generate a notification about the lane crossing and the lane crossing score; and provide the notification to a fleet manager associated with the vehicle.

14. The device of claim 8, wherein the one or more processors, to perform the one or more actions, are configured to one or more of:

schedule a driver of the vehicle for driver training based on the lane crossing score; or retrain the one or more neural network models based on the lane crossing score.

15. A non-transitory computer-readable medium storing a set of instructions, the set of instructions comprising:

one or more instructions that, when executed by one or more processors of a device, cause the device to:

receive forward facing video data associated with a vehicle;

process the forward facing video data, with one or more neural network models, to detect lane lines in the forward facing video data and to determine classifications for the lane lines;

classify the forward facing video data as a lane crossing or a lane change based on a crossing interval determined for the vehicle, wherein the crossing interval is identified by utilizing a mean and a standard deviation associated with a histogram of horizontal positions of the vehicle relative to closest left and right lane lines;

selectively:

calculate a lane crossing score based on classifying the forward facing video data as the lane crossing, or calculate a lane change score based on classifying the forward facing video data as the lane change; and perform one or more actions based on the lane crossing score or the lane change score.

16. The non-transitory computer-readable medium of claim 15, wherein the one or more instructions, that cause the device to process the forward facing video data, with the one or more neural network models, to detect the lane lines in the forward facing video data and to determine the classifications for the lane lines, cause the device to:

process the forward facing video data, lane line detection reference data, and lane line categories, with the one or more neural network models, to detect the lane lines and to determine the classifications for the lane lines.

17. The non-transitory computer-readable medium of claim 15, wherein the one or more instructions, that cause the device to classify the forward facing video data as the lane crossing or the lane change based on the crossing interval, cause the device to:

classify the forward facing video data as the lane crossing based on one or more lane lines of the forward facing video data being within the crossing interval; or classify the forward facing video data as the lane change based on the one or more lane lines of the forward facing video data satisfying a distance threshold.

18. The non-transitory computer-readable medium of claim 15, wherein the one or more instructions, that cause the device to calculate the lane crossing score based on classifying the forward facing video data as the lane crossing, cause the device to:

utilize a linear function to calculate the lane crossing score based on boundary values associated with the forward facing video data.

19. The non-transitory computer-readable medium of claim 15, wherein the one or more instructions, that cause the device to classify the forward facing video data as the lane crossing or the lane change based on the crossing interval, cause the device to:

aggregate frames of the forward facing video data into one or more events; and classify each of the one or more events as a lane crossing event or a lane change event based on the crossing interval.

20. The non-transitory computer-readable medium of claim 15, wherein the one or more instructions, that cause the device to perform the one or more actions, cause the device to one or more of:

provide a notification about the lane crossing or the lane change to a driver of the vehicle;

provide driving instructions to the vehicle to cause a path of the vehicle to be adjusted to correct the lane crossing;

provide a notification about the lane crossing and the lane crossing score to a fleet manager associated with the vehicle;

schedule a driver of the vehicle for driver training based on the lane crossing score; or retrain the one or more neural network models based on the lane crossing score or the lane change score.

* * * * *